United States Patent [19]

Bastanzuri

[11] Patent Number: 4,719,772
[45] Date of Patent: Jan. 19, 1988

[54] APPARATUS FOR REMOVING INK PARTICLES FROM PAPER PRODUCTS

[75] Inventor: Remberto P. Bastanzuri, Miami, Fla.

[73] Assignee: Michael Scheck, Miami, Fla.; a part interest

[21] Appl. No.: 18,844

[22] Filed: Feb. 24, 1987

Related U.S. Application Data

[62] Division of Ser. No. 703,950, Feb. 21, 1985, Pat. No. 4,680,088.

[51] Int. Cl.$^4$ .......................... D21C 9/06; D06B 1/02
[52] U.S. Cl. ................................. 68/205 R; 162/297; 210/400
[58] Field of Search .................. 162/53, 60, 189, 297; 210/400; 68/158, 204, 205 R; 8/156

[56] References Cited

U.S. PATENT DOCUMENTS

| | | | |
|---|---|---|---|
| 2,738,880 | 3/1956 | Whitney | 210/400 |
| 3,564,631 | 2/1971 | Burling | 162/60 |
| 4,014,736 | 3/1977 | Sexton | 162/60 |
| 4,046,621 | 9/1977 | Sexton | 162/60 |
| 4,154,644 | 5/1979 | Ericsson | 162/60 |
| 4,166,368 | 9/1979 | Beninca et al. | 68/205 R |
| 4,350,597 | 9/1982 | Selm et al. | 210/710 |
| 4,491,501 | 1/1985 | Klein | 162/60 |
| 4,501,040 | 2/1985 | Biondett et al. | 162/60 |
| 4,539,827 | 9/1985 | Klien et al. | 162/60 |

OTHER PUBLICATIONS

Black (Clawson Chemi-Washer Bulletin No. 66-14 Sb, undated.
Tappi Journal, vol. 66, No. 7, pp. 43-45 Jul. '83 "Operating Exprience with a New Horizontal Brown Stock Washer", by Ericsson and Moody.

*Primary Examiner*—S. Leon Bashore
*Assistant Examiner*—K. M. Hastings
*Attorney, Agent, or Firm*—Finnegan, Henderson, Farabow, Garrett & Dunner

[57] ABSTRACT

A process and apparatus for removing ink particles from an inked paper product which includes a conveyor for conveying the paper product along a path, the conveyor being constructed of a semi-permeable material that passes the ink particles while retaining the paper product. Vacuum boxes are positioned proximate to a first side of the conveyor for establishing a pressure differential across the conveyor and across a first segment of the path to draw the ink particles from the paper product through the conveyor. Shower heads on a second side of the conveyor directed a liquid toward the conveyor and on to the paper product as the paper product is advanced along the second segment of the path. Blocking members are positioned on the first side of the conveyor opposite the shower heads for substantially preventing the establishment of a pressure differential across the conveyor and across the second segment of the path and for preventing flow of liquid and ink particles through the conveyor across the second segment of the path.

5 Claims, 4 Drawing Figures

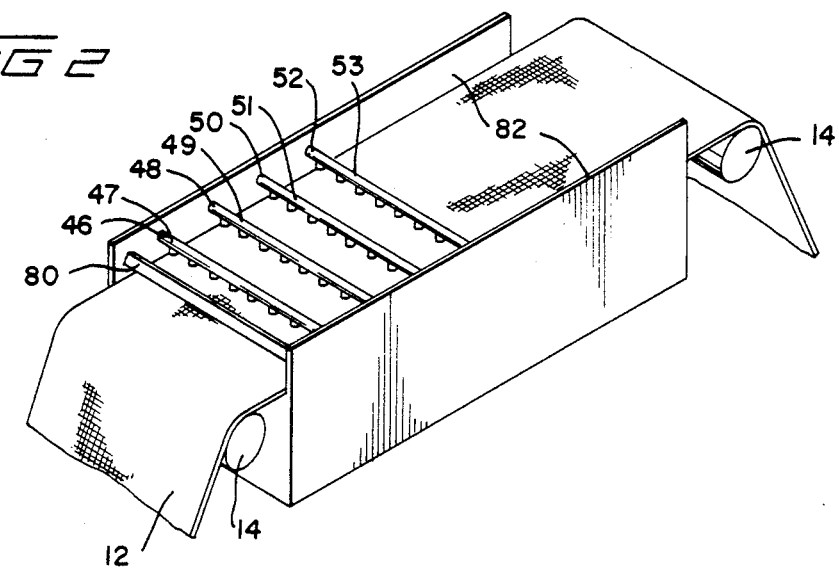
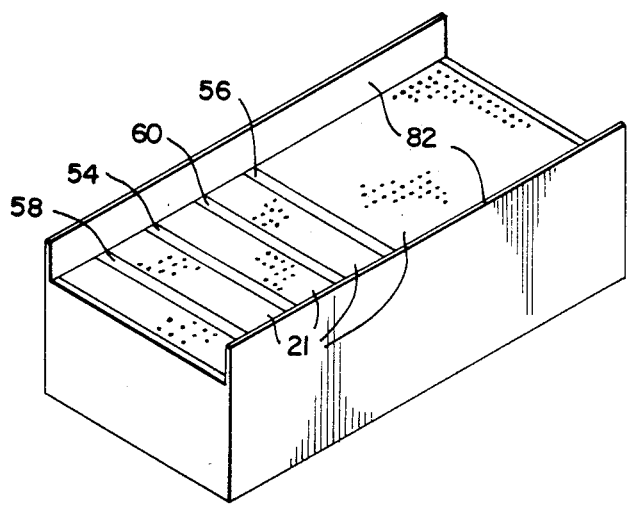
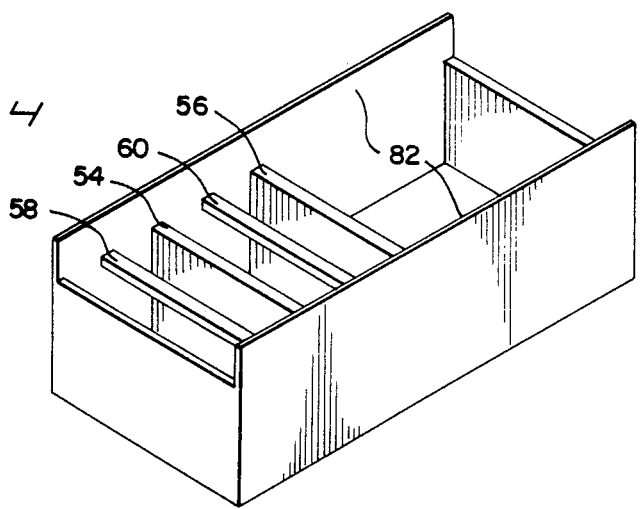

400
APPARATUS FOR REMOVING INK PARTICLES FROM PAPER PRODUCTS

This is a division of application Ser. No. 703,950, filed Feb. 21, 1985, now U.S. Pat. No. 4,680,088.

BACKGROUND OF THE INVENTION

1. Field of the Invention

The present invention relates to a method and apparatus for removing ink particles from paper products so that the paper products may be recycled.

2. Description of the Prior Art

Various processes and apparatus have been used to de-ink paper products so that the paper products may be recycled for further use. These known methods and apparatus use a series of stages in which the paper product is repeatedly washed. However, such devices have various disadvantages. In particular, there is a need for much space in setting up the apparatus and performing the method. In addition, known processes and apparatus contain other inefficiencies and complexities in set-up and operation.

Accordingly, it is an object of the present invention to provide a process and apparatus for de-inking paper products which does not require much space.

It is another object of the present invention to provide a process and apparatus for de-inking which is simple and efficient in set-up and operation.

Additional objects and advantages of the invention will be set forth in the description which follows, and in part will be obvious from the description, or may be learned from the practice of the invention. The objects and advantages of the invention may be realized and obtained by means of the instrumentalities and combinations particularly pointed in the appended claims.

SUMMARY OF THE INVENTION

To achieve the foregoing objects, and in accordance with the purposes of the invention as embodied and broadly described herein, a process is provided for removing ink particles from an inked paper product comprising forming a slurry from the inked paper product; flowing the slurry onto a surface of a semi-permeable conveyor having pores of sufficient size to pass the inked particles and retain the paper product on the surface of the conveyor; establishing a pressure differential across the conveyor to form a mat from the slurry; and showering the mat with liquid to break the mat and separate the ink particles from the paper product.

It is preferable that the step of establishing a pressure differential to form a mat occurs both before and after the step of showering the mat. It is further preferable that the step of showering the mat occurs in an area where substantially no pressure differential exists across the conveyor. It is additionally preferable that the showering step includes preventing the flow of liquid through the conveyor in the area of the paper product being showered.

To further achieve the foregoing objects, and in accordance with the purposes of the invention as embodied and broadly described herein, an apparatus is provided for removing ink particles from an inked paper product comprising means for conveying the paper product along a path, the conveying means being constructed of a semi-permeable material that passes the ink particles while retaining the paper product; means proximate to a first side of the conveying means for establishing a pressure differential across the conveying means and across a first segment of the path to draw the ink particles from the paper product through the conveying means; means on a second side of the conveying means for directing a liquid toward the conveying means and onto the paper product as the product is advanced along a second segment of the path; and means on the first side of the conveying means opposite the liquid directing means for substantially preventing the establishment of a pressure differential across the conveying means and across the second segment of the path.

The means for establishing a pressure differential preferably includes at least two chambers separated by the means for substantially preventing the establishment of a pressure differential. The means for establishing a pressure differential preferably includes at least one chamber, the chamber having an upstream end, a downstream end, and the means for preventing the establishment of a pressure differential positioned intermediate and spaced from the ends. The means for substantially preventing the establishment of a pressure differential preferably comprises a surface on a member proximate to the conveying means along the second segment of the path.

To additionally acheive the foregoing objects, and in accordance with the purposes of the invention as embodied and broadly described herein, an apparatus is provided for removing ink particles from an inked paper product comprising means for conveying the paper product along a path, the conveying means being constructed of a semi-permeable material that passes the ink particles while retaining the paper product; means proximate to a first side of the conveying means for establishing a pressure differential across the conveying means and across a first segment of the path to draw the ink particles from the paper product through the conveying means; means on a second side of the conveying means for directing a liquid toward the conveying means and onto the paper product as the product is advanced along a second segment of the path; means on the first side of the conveying means opposite the liquid directing means for substantially preventing flow through the conveying means and across the second segment of the path.

The means for establishing a pressure differential preferably includes at least two chambers separated by the means for substantially preventing flow through the conveying means. The means for establishing a pressure differential preferably includes at least one chamber, the chamber having an upstream and a downstream end, and the means for preventing flow through the conveying means positioned intermediate and spaced from the ends. The means for substantially preventing flow through the conveying means preferably comprises a surface on a member proximate to the conveying means along the second segment of the path.

BRIEF DESCRIPTION OF THE DRAWINGS

The accompanying drawings, which are incorporated in and constitute a part of the specification, illustrate a preferred embodiment of the invention and, together with a general description of the invention given above and the detailed description of the preferred embodiment given below, serve to explain the principles of the invention.

FIG. 2 is a perspective view of a portion of the apparatus shown in FIG. 1 showing the arrangement of shower heads;

FIG. 3 is a perspective view of a portion of the apparatus shown in FIG. 1 showing the arrangement of apertured plates and blocking members; and FIG. 4 is a perspective view of a portion of the apparatus shown in FIG. 1 showing the arrangement of blocking members.

DESCRIPTION OF THE PREFERRED EMBODIMENT

Figure 1:
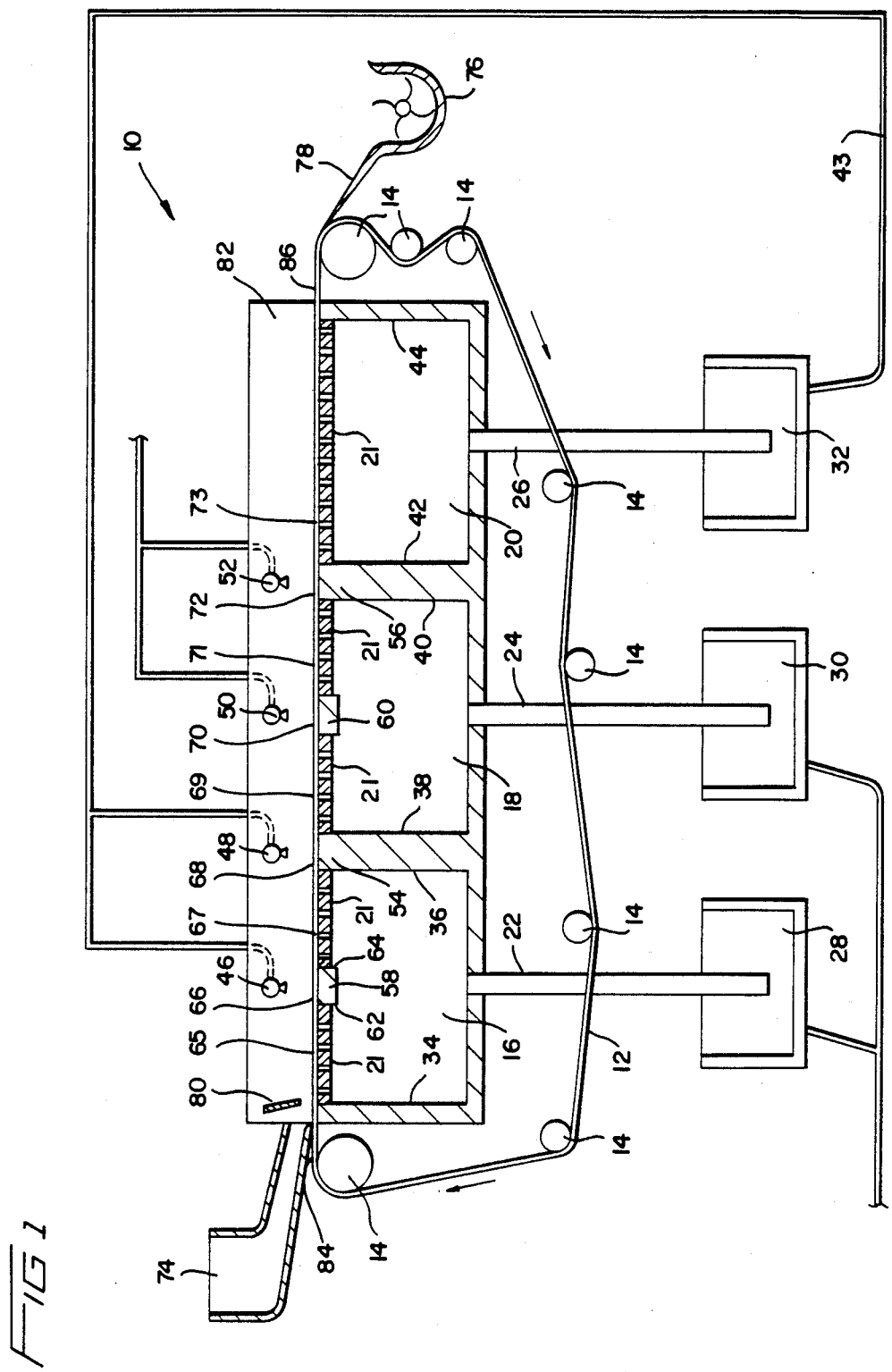
FIG. 1 is a cross-section view of an apparatus for removing ink particles from an inked paper product incorporating the teachings of the present invention.

Reference will now be made in detail to the present preferred embodiment of the invention as illustrated in the accompanying drawing.

In accordance with the present invention there is provided an apparatus for removing ink particles from an inked paper product comprising means for conveying the paper product along a path, the conveying means being constructed of a semi-permeable material that passes the ink particles while retaining the paper product; means proximate to a first side of the conveying means for establishing a pressure differential across the conveying means and across the first segment of the path to draw the ink particles from the paper product through the conveying means; means on a second side of the conveying means for directing a liquid toward the conveying means and onto the paper product as the paper product is advanced along a second segment of the path; and means on the first side of the conveying means opposite the liquid directing meant for substantially preventing the establishment of a pressure differential across the conveying means and across the second segment of the path.

As shown in FIG. 1, there is illustratively provided an apparatus 10 for removing ink particles from an inked paper product. The means for conveying the paper product preferably includes an endless conveyor belt 12 which is propelled and supported along an endless path by rollers 14. One or more of rollers 14 is positively driven. The conveyor belt is constructed of a semi-permeable material that passes the ink particles while retaining the paper product. An example of such a belt is the Spiralflex 79 made by Brandon Drying Fabrics Division of Columbia, S.C. Such a belt is a 30 mesh polymer weave having 30 threads per inch and is currently used in fabric drying processes. It is to be understood that such a material and such a conveying means are the present preferred embodiment of the invention and that the invention is not limited to conveying means which are endless belts.

The means proximate to a first side of the conveying means for establishing a pressure differential across the conveying means and across a first segment of the path to draw the ink particles from the paper product through the conveying means preferably includes vacuum chambers 16, 18 and 20. As shown in FIGS. 3 and 4, vacuum chambers 16, 18 and 20 are substantially airtight chambers with the exception of an open top area which includes apertured plates 21 that are covered by conveyor belt 12. Vacuum hoses 22, 24 and 26 are respectively attached to vacuum chambers 16, 18 and 20 to create a partial vacuum in vacuum chambers 16, 18 and 20. This creates a pressure differential across conveyor belt 12 in the areas which overlie the open portion of vacuum chambers 16, 18 and 20.

Vacuum hoses 22, 24 and 26 also remove material from vacuum chambers 16, 18 and 20 respectively to vats 28, 30 and 32, respectively. Vacuum chamber 16 has an upstream end wall 34 and a downstream end wall 36. Vacuum chamber 18 has an upstream end wall 38 and a downstream end wall 40. Vacuum chamber 20 has an upstream end wall 42 and a downstream end wall 44.

The means on a second side of the conveying means for directing a liquid toward the conveying means and onto the paper product as the paper product is advanced along a second segment of the path is preferably a series of shower heads 46, 48, 50 and 52 which, as shown in FIG. 2, include conduits 47, 49, 51 and 53 extending transversely across the path of conveyor belt 12 and spaced from the second side of conveyor belt 12. Conduits 47, 49, 51 and 53 include a series of spaced nozzles for directing jets of liquid onto conveyor belt 12.

The means on the first side of the conveying means opposite the liquid directing means for substantially preventing the establishment of a pressure differential across the conveying means and across the second segment of the path preferably include a series of first blocking members 54 and 56 and second blocking members 58 and 60. By illustration, first blocking member 54 preferably includes a block having a flat top surface which is positioned between or constitutes the structure between end wall 36 of vacuum chamber 16 and end wall 38 of vacuum chamber 18. In this manner, the surface of first blocking member 54 which underlies and contacts the advancing conveyor belt 12 between end walls 36 and 38 prevents the establishment of a pressure differential across conveying means 12 in the area between end walls 36 and 38. It is also in this area that the liquid from shower head 48 is distributed toward the portion of conveyor belt 12 which overlies the first blocking member 54, namely, the area between end walls 36 and 38.

By illustration, second blocking member 58 preferably has a flat top surface which underlies and contacts the first surface of the advancing conveyor belt 12 intermediate and spaced from upstream end wall 34 and downstream end wall 36. Thus, second blocking member 58 prevents the establishment of a pressure differential across conveyor belt 12 in the segment overlying second blocking member 58 between second blocking member end walls 62 and 64.

In such a manner, it is seen that the path of conveyor belt 12 is divided into alternating first and second segments. The first segments are areas in which a pressure differential is established across conveyor belt 12. The second segments of the path are portions in which the establishment of a pressure differential across conveyor belt 12 is prevented by first blocking members 54 and 56 and second blocking members 58 and 60. As seen from FIG. 1, first segments include segments 65 and 67 in vacuum chamber 16, segments 69 and 71 in vacuum chamber 18, and segment 73 in vacuum chamber 20. Second segments include second segment 66 intermediate vacuum chamber 16, second segment 68 between vacuum chambers 16 and 18, second segment 70 intermediate vacuum chamber 18, and second segment 72 between vacuum chambers 18 and 20.

In accordance with the invention, the means for establishing a pressure differential preferably includes at least two chambers separated by the means for substantially preventing the establishment of a pressure differential. As embodied in the figures, it is seen that the two chambers represented by vacuum chambers 16 and 18 are separated by means for substantially preventing the establishment of a pressure differential such as first blocking member 54. In addition, it is seen that the two chambers such as vacuum chambers 18 and 20 are separated by means for substantially preventing the establishment of a pressure differential such as first blocking member 56.

In accordance with the present invention, the means for establishing a pressure differential preferably includes at least one chamber, the chamber having upstream, downstream and the means for preventing the establishment of a pressure differential intermediate and spaced from the ends. As shown in the drawing, a chamber such as vacuum chamber 16 has an upstream end 34, a downstream end 36, and includes means for preventing the establishment of a pressure differential intermediate and spaced from ends 34 and 36 such as second blocking member 66.

In accordance with the present invention, the means for establishing a pressure differential preferably comprises the surface on a member proximate to the conveying means along the second segment of the path. As shown in the drawing, the surface on a member proximate to the conveying means includes the upwardly facing surfaces of first blocking members 54 and 56 and second blocking members 58 and 60 which underlie conveyor belt 12.

Apparatus 10 also includes a head box 74 which is located at the upstream end of the conveyor belt 12. Head box 74 is used for distributing a paper product slurry on conveyor belt 12. Apparatus 10 is also provided with a foot box 76 at the downstream end of the path and a doctor blade 78. Footbox 76 gathers the paper product after it is removed from conveyor belt 12 by doctor blade 78. A spreader 80 is located at the upstream end of the path near head box 74 and includes an inclined plate extending across the transverse width of conveyor belt 12 and spaced from conveyor belt 12 for forming a layer of paper product of uniform thickness on conveyor belt 12.

It is seen from FIG. 1 that a variety of conduits, such as conduit 43, are provided so that liquid drawn off from a downstream vat 32 can be recycled for use in upstream shower heads 46 and 48 to conserve liquid.

In operation, the apparatus is used in the following manner. Inked paper product is formed into a slurry by a pulper which is not shown in the drawing. The pulper forms no part of the invention. As known to those skilled in the art, a pulper has blades which chop paper into small pieces in the presence of known chemicals to form a slurry. The slurry is poured into head box 74 and then flowed or extruded as a layer onto the upstream end of conveyor belt 12. The layer is applied and formed to a uniform thickness transversely across the conveyor belt by spreader 80. Throughout the whole process, conveyor belt 12 continually moves along its endless path, carrying the paper product with it.

After being spread by spreader 80, the inked paper product in slurry form reaches first segment 65 of the path where it is subjected to a pressure differential by vacuum chamber 16 relative to the standard atmospheric pressure. By establishing the pressure differential across the conveyor at first segment 65, ink particles and liquid from the slurry are drawn through semipermeable conveyor belt 12 into vacuum chamber 16, down vacuum hose 22 and into vat 28, leaving a mat of substantially defluidized paper and residue ink on conveyor belt 12.

The paper product advances to second segment 66 overlying second blocking member 58 which prevents or interrupts the establishment of a pressure differential across conveyor belt 12. The paper product is also exposed to a shower of liquid from shower head 46 while in second segment 66 of the path. Second blocking member 58 also substantially prevents flow through conveyor belt 12 in the area of second segment 66 of the path because the top surface of second blocking member 58 effectively blocks the pores of conveyor belt 12 in this area. Therefore, the paper product which arrives at second segment 66 in mat form is broken up and formed into at slurry by the liquid supplied from shower head 46. During this step in the process, the mat is broken up and again formed into a slurry, thus allowing the residue ink particles to separate from the paper and be suspended in the liquid of the slurry mix.

The paper product in its slurry form then advances to first segment 67 where it is exposed to a pressure differential which draws the liquid and the suspended ink particles from the slurry into vacuum chamber 16 and which again forms a substantially defluidized mat from the slurry. The alternating process of forming a mat on first segments of the path and breaking the mat and forming a slurry on the second segments of the path continues as the paper product moves downstream along the path.

It is noted that the number of vacuum chambers and the relative number of first and second blocking members may be altered. For instance, it is possible to have a design in which two second blocking members are stationed within a single vacuum chamber, each paired with a shower head.

In addition, it is seen that the pressure of the liquid from the shower head, the distance between the shower head and the conveyor belt, and the pressure of the vacuum in the vacuum chambers can be varied in accordance with producing mats of varying thicknesses. For instance, it is possible to produce a mat having a thickness of ½ inch by using a shower pressure of 20–30 pounds per square inch, a vacuum of 8–10 inches of mercury, and a placement of the shower heads eight inches from the conveyor belt. Also, as presently preferred, the conveyor belt is approximately 45 feet long and 80 inches wide to produce a path between the upstream and the downstream ends of about 20 feet in length. Additionally, as presently preferred, the longitudinal width of first blocking members 54 and 56 and second blocking members 58 and 60 is approximately 4 to 5 inches. Namely, the distance between walls 62 and 64 a well as between walls 36 and 38 is approximately 4 to 5 inches. As with the other parameters of the apparatus, this parameter also may be varied to ensure maximum deinking of the paper.

It is to be noted that the mat formed of the paper product over vacuum chamber 20 is removed from conveyor belt 12 by doctor blade 78 and gathered in foot box 76.

Also, as shown in FIG. 2, guide rails 82 are provided along both sides of the coveyor belt to maintain the lateral limits of the paper product generally within the confines of conveyor belt 12.

In accordance with the present invention, there is also provided an apparatus for removing ink particles from an inked paper product comprising means for conveying the paper product along a path, the conveying means being constructed of a semi-permeable material that passes the ink particles while retaining the paper product; means proximate to a first side of the conveying means for establishing a pressure differential across the conveying means and across the first segment of the path to draw the ink particles from the paper product through the conveying means; means on a second side of the conveying means for directing a liquid toward the conveying means and onto the paper product as the paper product is advanced along a second segment of the path; and means on the first side of the conveying means opposite the liquid directing means for substantially preventing flow through the conveying means and across the second segment of the path.

As discussed above, and as illustratively shown in the Figures, the means for conveying includes endless conveyor belt 12, the means for establishing a pressure differential across the conveying means includes vacuum chambers 16, 18, and 20, the means for directing a liquid towards the conveying means includes shower heads 46, 48, 50 and 52. The means for substantially preventing flow through the conveying means includes first blocking members 54 and 56 and second blocking member 58 and 60. These blocking members prevent flow through conveyor belt 12 in the area of second segments 66, 68, 70 and 72 because the blocking members preferably include a surface which underlies conveyor belt 12 in the area of the second segments and blocks the flow of ink particles and liquid in the area of the second segment.

In accordance with the present invention there is provided a process for removing ink particles from the inked paper product comprising: forming a slurry from the inked paper product; flowing the slurry onto a surface of a semi-permeable conveyor having pores of sufficient size to pass the ink particles and retain the paper product on the surface of the conveyor; establishing a pressure differential across the conveyor to form a mat from the slurry; and showering the mat with liquid to break the mat and separate the ink particles from the paper product.

The step of forming a slurry from the inked paper product is known and forms no part of the invention. Therefore it will not be discussed in further detail here. As described above, the step of flowing the slurry onto the surface of conveyor belt 12 includes loading an inked paper product in a slurry state into head box 74 so that it flows onto the upstream end 84 of conveyor belt 12 and is applied and spread to a uniform thickness by stationary blade spreader 80 which forms a converging path for the slurry as it progresses downstream toward the downstream end 86 of conveyor belt 12.

The pressure differential is established across conveyor belt 12 by vacuum chamber 16, 18 and 20 as described above. Liquid and ink particles from the slurry are passed through semi-permeable conveyor belt 12 and the paper product is retained on the surface of conveyor belt 12 in a mat form having a greater structural integrity and much less water than the paper product in a slurry state.

The showering step includes showering the paper product which arrives in a mat state with a liquid which is preferably water so as to break the mat, reduce its structural integrity, increase the concentration of water and separate the ink particles from the paper product in transforming the paper product in the mat state into a slurry state. It is preferable to form a pressure differential across conveyor belt 12 both before and after the step of showering the mat in order to more effectively separate the ink particles from the paper product and remove the particles from the paper product by drawing them through semi-permeable conveyor belt 12.

As noted above, it is preferable that the step of showering the mat occurs in an area where substantially no pressure differential exists across the conveyor. This is in the area of second segments 66, 68, 70 and 72 which lie above first blocking members 54 and 56 and second blocking members 58 and 60. In addition, it is preferred that the showering step includes preventing the flow of liquid through the conveyor in the area of the paper product being showered. As noted above, this is also accomplished by first blocking members 54, 56 and second blocking members 58, 60.

It is noted that it is preferable that the liquid used in the process is water. Also, it is preferable that the process is performed on a continuously moving conveying surface disposed in a substantially horizontal plane as shown in FIG. 1. Additionally, it is preferable that the showering step is performed by a liquid flowing through a plurality of linearly arranged nozzles so that the flow is in the form of plurality of fluid jets substantially perpendicular to the conveyor surface as shown in FIG. 1 to aid in effectively breaking the mat.

Finally, it is noted that the disclosed process and apparatus removes ash from the paper product while removing ink particles. As known to those having skill in the art, ash is used as a filler between paper fibers for producing characteristics which are desirable in some paper products. Therefore, it is necessary to add ash when manufacturing such paper products from the end product of the disclosed process and apparatus.

Additional advantages and modifications will readily occur to those skilled in the art. The invention in its broader aspects is, therefore, not limited to the specific details, representative apparatus and illustrative examples shown and described. Accordingly departures may be made from such details without departing from the scope or spirit of applicant's general inventive concept.

What is claimed is:

1. An apparatus for removing ink particles from an inked paper product comprising:
   means for conveying the paper product along a path, said conveying means being constructed of a semi-permeable material that passes the ink particles while retaining the paper product;
   means proximate to a first side of the conveying means for establishing a pressure differential across the conveying means and across a first segment of said path to draw the ink particles from the paper product through said conveying means;
   means on a second side of the conveying means for directing a liquid toward the conveying means and onto the paper product to break the paper product into a slurry as the paper product is advanced along a second substantial segment of said path; and
   means on the first side of the conveying means directly opposite the liquid directing means for substantially preventing the establishment of a pressure differential across and flow through the conveying means and across the second substantial segment of the path.

2. The apparatus of claim 1 wherein the means for establishing a pressure differential includes at least two chambers separated by said means for substantially preventing the establishment of a pressure differential and flow.

3. The apparatus of claim 1 wherein the means for establishing a pressure differential includes at least one chamber, said chamber having an upstream end, a downstream end, and said means for substantially preventing the establishment of a pressure differential and flow is positioned intermediate and spaced from said ends.

4. The apparatus of claim 1 wherein the means for substantially preventing the establishment of a pressure differential and flow comprises a surface on a member proximate to the conveying means along the second segment of the path.

5. The apparatus of claim 1 including spreader means for applying and forming a slurry of uniform thickness transversely across the conveying means.

* * * * *